(12) United States Patent
Lischtschenko

(10) Patent No.: US 12,455,161 B2
(45) Date of Patent: Oct. 28, 2025

(54) MEASUREMENT DEVICE FOR MEASURING LIGHT, MEASUREMENT SYSTEM AND MEASUREMENT METHOD FOR DETECTING LIGHT PARAMETERS

(71) Applicant: Oliver Lischtschenko, Lüdersdorf (DE)

(72) Inventor: Oliver Lischtschenko, Lüdersdorf (DE)

( * ) Notice: Subject to any disclaimer, the term of this patent is extended or adjusted under 35 U.S.C. 154(b) by 103 days.

(21) Appl. No.: 18/110,042

(22) Filed: Feb. 15, 2023

(65) Prior Publication Data
US 2023/0194244 A1 Jun. 22, 2023

(30) Foreign Application Priority Data
Feb. 16, 2022 (EP) ...................................... 22157101

(51) Int. Cl.
*G01B 11/16* (2006.01)
(52) U.S. Cl.
CPC .......... *G01B 11/168* (2013.01); *G01B 11/161* (2013.01)
(58) Field of Classification Search
CPC  G01B 11/161; G01B 11/168; G01B 9/02047; G01B 11/164; G01B 9/021–029; G01J 3/0218; G01J 3/0224; G01J 3/447; G01J 3/45

See application file for complete search history.

(56) References Cited

U.S. PATENT DOCUMENTS

| | | | |
|---|---|---|---|
| 2014/0240951 A1* | 8/2014 | Brady | G01J 3/0218 362/583 |
| 2015/0205260 A1* | 7/2015 | Awatsuji | G03H 1/0443 348/40 |
| 2015/0285684 A1* | 10/2015 | Robinson | G01J 3/2823 356/453 |
| 2020/0256667 A1 | 8/2020 | Zhang et al. | |
| 2022/0018649 A1* | 1/2022 | Furman | G01B 9/0209 |

OTHER PUBLICATIONS

Search Report for European Application No. 22157101.1 Mailed Aug. 16, 2022, with its English translation.
Peng et al., High-SNR static Fourier-transform imaging spectrometer based on differential structure, Progress in Biomedical Optics and Imaging, SPIE-International Society for Optical Engineering, Bellingham, WA, US, vol. 9328, pp. 93280W-93280W, Mar. 2, 2015.
Office Action for European Patent Application No. 22 157 101.1, mailed Aug. 14, 2024, and its English translation, 16 pages.
Allcock et al., 2D measurements of plasma electron density using coherence imaging with a pixelated phase mask, Review of Scientific Instruments, Jul. 2021, vol. 92, No. 073506, 15 pages.

* cited by examiner

*Primary Examiner* — Hina F Ayub
(74) *Attorney, Agent, or Firm* — Nicholas D. Cervenka; Bret E. Field; Bozicevic, Field & Francis LLP

(57) ABSTRACT

The invention relates to a measurement device (10) for measuring light (200) from a light source (2), comprising an optical unit (30) with a delay element (31) for splitting a polarized light beam (210) of the light (200) into a first partial beam (211) and a second partial beam (212), which have a defined phase shift relative to one another. Furthermore, the invention relates to a measurement system (1), as well as a measurement method (100).

13 Claims, 5 Drawing Sheets

Figure 1:
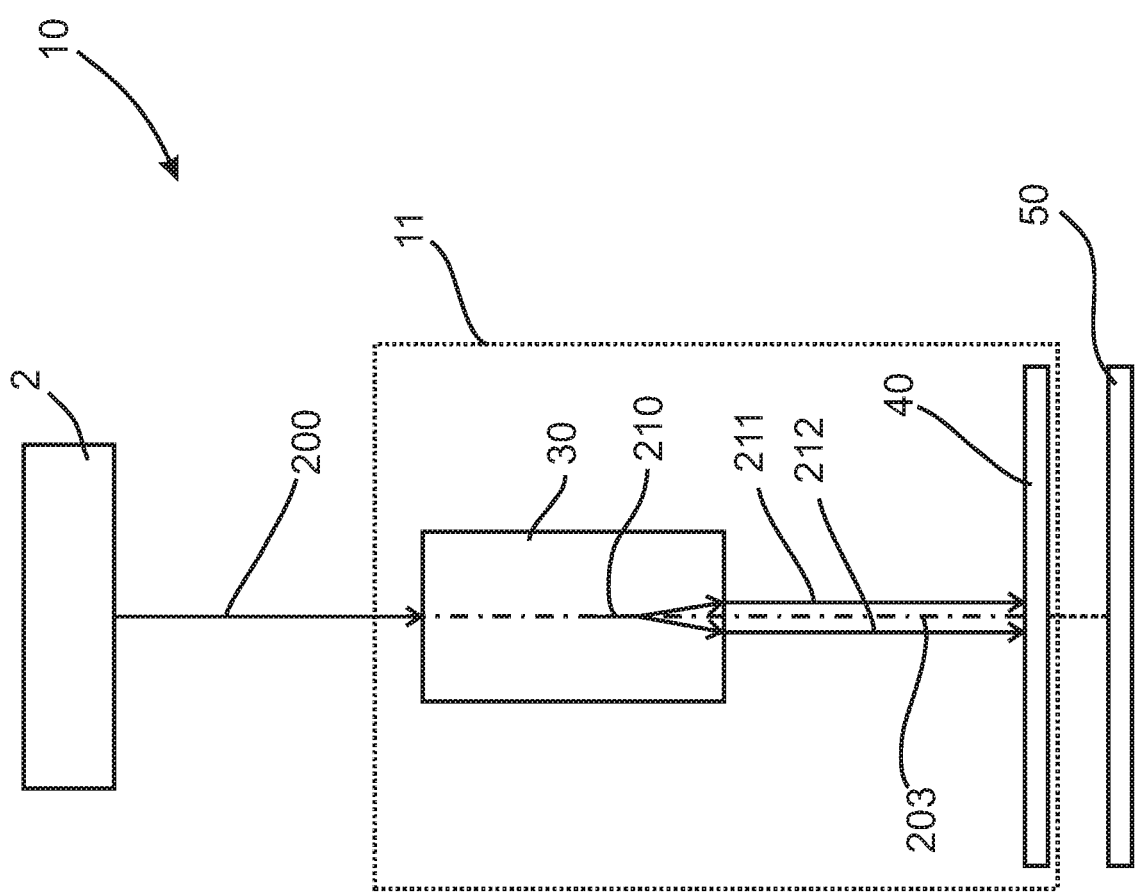

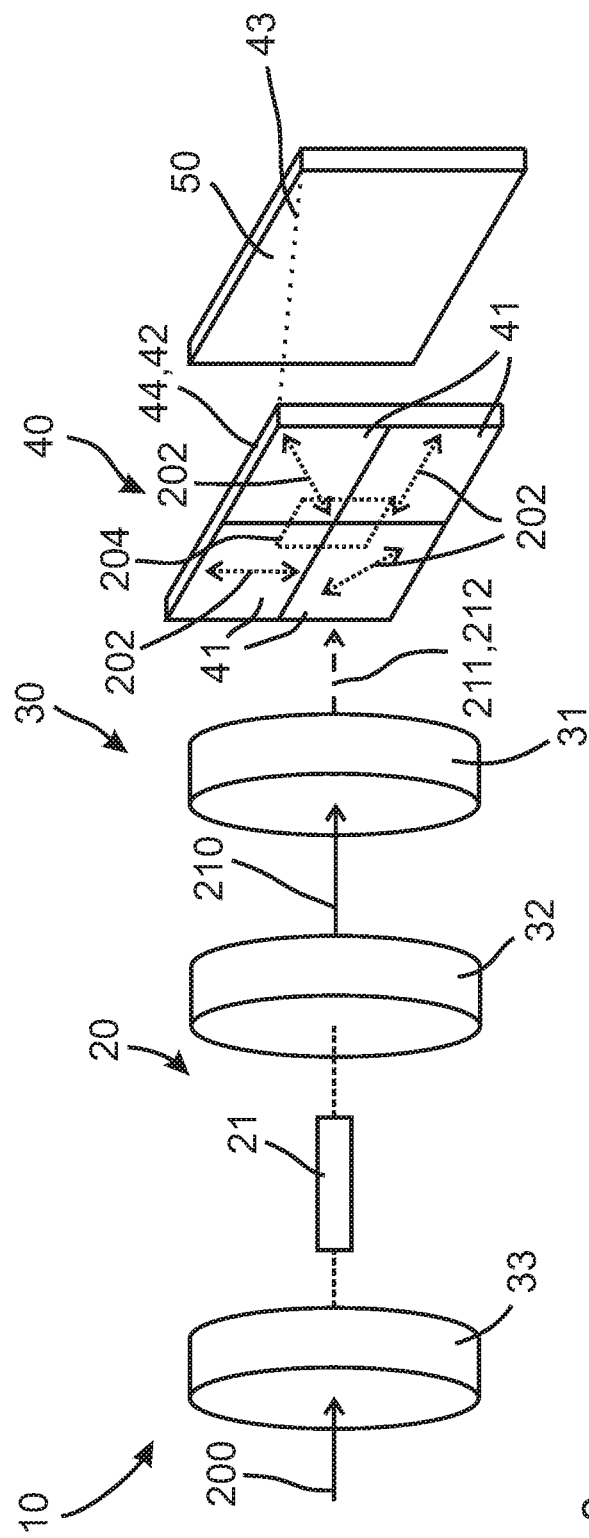
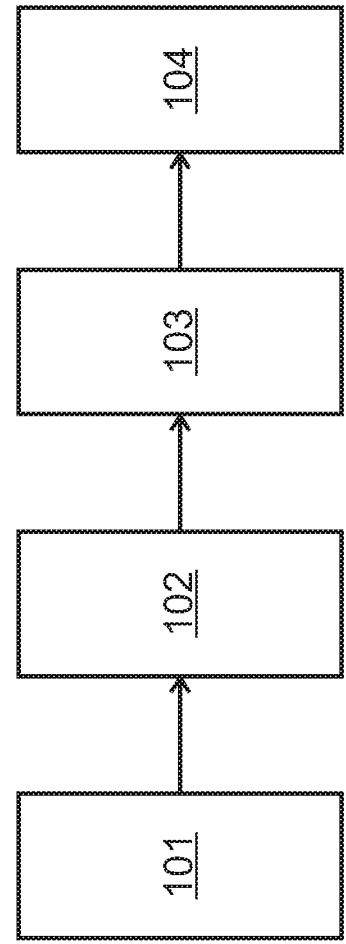
Fig. 2
Fig. 3

MEASUREMENT DEVICE FOR MEASURING LIGHT, MEASUREMENT SYSTEM AND MEASUREMENT METHOD FOR DETECTING LIGHT PARAMETERS

The invention relates to a measurement device for measuring light, a measurement system, and a measurement method for detecting light parameters.

It is well known that the interference behavior of light can be used to infer the properties of the light and, in particular, of the light source. For example, a Michelson interferometer can be used to measure a change in length based on an interference pattern of two partial beams.

However, such measurement devices are usually susceptible to external influences such as temperature fluctuations, ambient light or mechanical vibrations. This can lead to measurement errors and/or high calibration and/or adjustment costs. In addition, such measurement devices require a complex setup, which can result in correspondingly high costs.

It is an object of the present invention to at least partially overcome the above-mentioned disadvantages known from the prior art. In particular, it is an object of the present invention to enable a cost-effective and robust measurement of light from a light source.

The foregoing problem is solved by a measurement device, a measurement system, and a measurement method as described herein. Further features and details of the invention result from the respective dependent claims, the description and the drawings. In this context, features and details described in connection with the measurement device according to the invention naturally also apply in connection with the measurement system according to the invention and/or the measurement method according to the invention, and vice versa in each case, so that reference is or can always be made mutually with regard to the disclosure concerning the individual aspects of the invention.

According to a first aspect of the invention, a measurement device for measuring light from a light source is provided. The measurement device comprises an optical unit for splitting a polarized light beam of the light into a first partial beam and a second partial beam, which have a, preferably defined, phase shift relative to one another. Furthermore, the measurement device comprises a sensor unit with at least two detector elements, which each have a polarization with a, in particular in each case, different orientation about an optical axis. The first and second partial beams can be jointly aligned with the detector elements by the optical unit in order to detect interference of the first and second partial beams by the detector elements.

The light source can comprise a laser or an LED, for example. The light from the light source is emitted in particular in the direction of the measurement device. For example, the optical unit can be positioned directly in front of the light source to measure the light. It is conceivable that the optical unit has a lens to receive the light from the light source.

It may be provided that the light from the light source is pre-polarized. For example, the light source may be a polarized light source. Preferably, the light is narrow band light.

The optical axis can be an optical axis of the optical unit and/or the light beam. The optical unit can be penetrated by the light beam in a straight line or in a substantially straight line. The splitting of the first and second partial beams can preferably take place in such a way that both partial beams maintain the propagation direction of the light beam. It can be provided that only the phase of the light beam is influenced by the optical unit in order to split the light beam into the two partial beams with the defined phase shift.

The optical unit can be configured for optical, magnetic and/or electrical influencing of at least one electromagnetic property, in particular a phase, of the light beam. In particular, the optical unit can be configured for a double refraction of the light beam in order to realize the phase shift of the first and second partial beam. The first partial beam can be an ordinary beam, the second partial beam can be an extraordinary beam of the birefringence.

The detector elements can comprise semiconductor components, for example in the form of photodiodes, through which an electrical signal can be output depending on the interference of the first and second partial beams. Based on the electrical signal, light parameters of the light can be concluded, for example, by an evaluation unit.

Preferably, the measurement device has a housing in which the sensor unit and/or the optical unit are arranged. The housing can, for example, comprise a plastic. By means of the housing, disturbing effects of an ambient light can be reduced or avoided. Furthermore, the components of the measurement device can be protected by the housing.

The interference is in particular a polarized interference. For polarization of the detector elements, the sensor unit can comprise polarizers. Furthermore, it is conceivable that the detector elements each comprise a polarizer, for example in the form of a polarization filter. Preferably, the polarizer may be integrated into the detector elements, in particular in the form of a chip-integrated polarizer. For example, the detector elements may comprise complementary metal oxide semiconductors (CMOS) with metal grating polarizers.

By the common alignment of the two partial beams to the detector elements it can be understood that at least a partial interference pattern can be aligned to each of the detector elements. Preferably, an interference pattern of the interference is aligned centered on the detector elements such that the interference pattern is uniformly distributed across the detector elements. For example, the interference may be aligned such that an equal intensity value of light is measurable through each of the detector elements. However, it is equally conceivable that the interference pattern is unevenly distributed among the detector elements. In this case, the measurement device and/or a higher-level measurement system can be adjusted or is adjustable or calibrated or calibratable in order to compensate for the unequal distribution, in particular by calculation. For example, the detector elements may be weighted depending on a respective measured intensity of the light.

Thus, it has been recognized in the context of the present invention that detecting the light beam, particularly a single light beam, may be sufficient to measure the light. By aligning the first and second light beams to one another, the complexity of the measurement device can be reduced. This can further provide a high robustness of the measurement device, in which the measurement device is less susceptible to external influences, such as temperature fluctuations. At the same time, precise measurement of light parameters can be performed by the measurement device based on output quantities of the detector elements.

Furthermore, in a measurement device according to the invention, it is conceivable that the optical unit comprises at least one delay element, in particular in the form of a birefringent medium. The birefringent medium may be, for example, a birefringent crystal or a birefringent plastic element. The delay element may comprise a delay plate. It may be provided that the optical unit comprises a plurality of delay elements, in particular connected in series, for splitting the polarized light beam into the first and second partial beams. In particular, if the medium is a crystal, the crystal may comprise, for example, a mineral of a mica group. The medium may allow the defined phase shift of the first and second partial beams to be predeterminable. The birefringent medium may allow the phase shift to be statically predetermined. By the type of birefringent medium, the phase shift may be adjustable. For example, the medium can be specifically configured depending on a type of light or light source. It is conceivable that the measurement device comprises a changing device for changing the medium depending on the light or the light source. In this way, the measurement device can be flexibly adapted to an application.

Furthermore, in a measurement device according to the invention, it can be advantageously provided that the measurement device, preferably the optical unit, has a polarization element for influencing, in particular for changing, a polarization of the light for the polarized light beam. In particular, the polarization element can generate the polarized light beam from the light. Preferably, the polarization element is connected upstream of the delay element in the optical unit with respect to a propagation direction. However, it is equally conceivable that the polarization element is arranged outside the optical unit in order to generate the polarized light beam. Through the polarization element, unpolarized or non-linearly polarized light of the light source can be measured by the measurement device.

It is further conceivable in a measurement device according to the invention that the polarization element is configured to generate a linear and/or random polarization of the light beam. This allows non-linearly polarized light from the light source to be measured by the measurement device. For example, the polarization element may comprise a diffuser and/or a wave plate. Additionally or alternatively, polarization effects of the light can be determined by measuring a polarization angle in the optical unit in a calibration and/or adjustment process and taken into account when evaluating the interference.

Within the scope of the invention, it is further conceivable that a channeling unit for channeling and/or discretizing the light depending on the received light is provided, which is optically connected upstream of the optical unit, in particular wherein the received light can be converted into a single-channel light by the channeling unit. The single-channel light can form the light beam and/or be transformed into the light beam by the polarization element. In particular, a reduction of the light information can be performed by the channeling unit to reduce the complexity of the received light. For example, the light can be reduced to an image point, in particular to represent a pixel. By the single-channel light, it can be understood in particular that the light has a single mode. For example, the channeling unit may comprise a pinhole to reduce the received light to the single-channel light. Thus, the discretization of the light can be done optically, and in particular before the light enters the optical unit. Within the scope of the invention, it has been recognized that an evaluation of reduced light information is sufficient for many applications. Thus, the complexity of the measurement device can be reduced and the robustness can be increased. Furthermore, a computing power of the evaluation unit can be reduced due to the early discretization.

It is further conceivable in a measurement device according to the invention that the channeling unit has a channeling element in the form of an optical fiber, in particular in the form of a single mode fiber, for channeling the light. In this context, the channeling unit and/or the measurement device may comprise exactly one, i.e. in particular a single, optical fiber. The optical fiber may preferably be formed by a glass fiber. Through the optical fiber, the light can thus be convertible into a single-channel light. A single mode fiber may also be referred to as a single mode fiber. Through the channeling element, light information can thus be advantageously reduced in order to realize the interference on the detector elements and/or to simplify the evaluation.

It is further conceivable in a measurement device according to the invention that the channeling unit comprises a collimator and/or a pinhole for forming a beam path of the light. Preferably, the collimator and/or the pinhole is arranged upstream of the optical unit with respect to a propagation direction of the light. For example, the collimator may form an input for receiving the light from the measurement device. By means of the collimator, a parallel or nearly parallel beam path of the light and thus in particular a linear or nearly linear guidance of the light can be generated. The pinhole can preferably comprise at least one aperture for shaping the beam path, which has an aperture diameter of less than or equal to 2 mm. By shaping the beam path of the light, the light beam may be or become aligned. As a result, the guidance of the light in the measurement device can be improved, whereby measurement errors and/or an adjustment effort can be reduced.

Preferably, in a measurement device according to the invention, it can be provided that the sensor unit has three or more detector elements, which are arranged in particular in a pattern. The pattern may be a regular pattern. A larger number of detector elements can improve the measurement accuracy. The pattern can have a row-like and/or matrix-like configuration. For example, the sensor unit may comprise four detector elements, which are preferably arranged in a 2×2 pattern, in particular with a common center. In particular, this allows interference to be aligned to all detector elements in a simple manner. For example, an intensity of the light can be uniformly distributed over the detector elements. However, it is equally conceivable that the detector elements are lined up next to one another. In this case, the interference may be unevenly distributed over the detector elements. It can be provided that a calibration and/or adjustment process can be performed by an evaluation unit of a higher-level measurement system in order to take into account an uneven distribution of the interference over the detector elements when evaluating the interference.

Furthermore, in a measurement device according to the invention, it is conceivable that the sensor unit has an electrical measurement output for outputting a modulation of a signal, in particular an electrical signal, and/or for outputting data points for modulating a signal, in particular an electrical signal, depending on of the interference. In this context, the signal is in particular characteristic for light parameters of the light. For example, the signal may be sinusoidal or cosinusoidal. For example, the signal can represent an intensity of the light and/or an electrical quantity proportional to the intensity of the light. By means of the data points, the course of the signal can be determined. By modulating the signal, the light parameters can be determined.

It is also conceivable in a measurement device according to the invention that the sensor unit has an evaluation circuit in which the detector elements are connected for detecting the interference, preferably with the evaluation circuit being configured to provide the signal and/or the data points by means of a multiplexing method, in particular in the form of a space multiplexing method and/or a time multiplexing method. For the space multiplexing method, the evaluation circuit can have a plurality of transmission channels which, in particular for parallel and simultaneously exclusive use by the detector elements, are configured and/or bundled in a matrix-like manner. Thereby, the evaluation circuit can comprise several switches to define and/or influence signal paths in the evaluation circuit. The evaluation circuit may be capable of outputting an electrical signal for each of the detector elements. Furthermore, the electrical signal can be assignable to each of the detector elements by the evaluation circuit. Thus, an advantageous evaluation of the detector elements is made possible. Furthermore, the multiplexing method can reduce the installation space of the measurement device.

Furthermore, in a measurement device according to the invention, it is conceivable that the detector elements are attached, in particular printed on, in a layer-like manner to a printed circuit board of the sensor unit. This allows the measurement device to have a compact configuration. Furthermore, a thin-layer, precise manufacturing can be made possible by a printing process, whereby a measuring accuracy of the measurement device can be improved.

Furthermore, in a measurement device according to the invention, it can be advantageously provided that the sensor unit and/or the detector elements are configured to be rotatable relative to the optical unit for adjusting the measurement device. The sensor unit and/or the detector elements can be rotatably arranged in a housing of the measurement device. However, it is also conceivable that the optical unit is rotatably arranged in the housing. This allows optical effects that occur during adjustment, such as an offset of the light beam and/or of the two partial beams, to be compensated for mechanically, optically and/or numerically.

According to a further aspect of the invention, a measurement system for detecting light parameters of light from a light source is provided. The measurement system has a measurement device, in particular a measurement device according to the invention, which comprises an optical unit for splitting a polarized light beam of the light into a first partial beam and a second partial beam, which have a defined phase shift relative to one another. Furthermore, the measurement device comprises a sensor unit with at least two detector elements, each having a polarization with a different orientation around an optical axis. In this case, the first and second partial beams can be aligned to one another on the detector elements by the optical unit in order to detect interference of the first and second partial beams by the detector elements. Furthermore, the measurement system comprises an evaluation unit for evaluating the interference to detect light parameters of the light.

Thus, a measurement system according to the invention brings the same advantages as have already been described in detail with reference to a measurement device according to the invention. The evaluation unit may comprise a processor and/or a microprocessor. Further, the evaluation unit may be integrated into the measurement device or may be implemented separately from the measurement device. For example, the measurement device may have a measurement output to which the evaluation unit is connected or connectable.

It may be provided that the light source is part of the measurement system. For example, the light source may comprise a Fiber Bragg grating, in particular for measuring a stretch of a component. Thus, it is conceivable that the measurement system is configured for stretch measurement in a wind turbine and/or a vehicle. Further, the light source may be, for example, a laser and/or an atomic emission component. In this case, the measurement device can be used to determine a wavelength and/or bandwidth of the light emitted by the light source.

Furthermore, in a measurement system according to the invention, it can be advantageously provided that the evaluation unit is configured to determine the light parameters in the form of a wavelength of the light depending on a phase of the interference, a bandwidth of the light depending on an amplitude of the interference, and/or a power of the light depending on an mean value of the interference. For this purpose, for example, an electrical signal of the sensor unit can be sampled in order to determine the light parameters on the basis of the signal.

According to a further aspect of the invention, a measurement method is provided for detecting light parameters of light from a light source by a measurement system according to the invention. The measurement method comprises, in particular in the form of method steps/stages:

Receiving light from a light source, in particular by a measurement device of the measurement system, Splitting of a polarized light beam of the light into a first partial beam and a second partial beam, which have a defined phase shift relative to one another, in particular by an optical unit of the measurement device, Generating an interference in dependence of the first and second partial beam, in particular by the optical unit, Detection of light parameters of the light depending on the interference, in particular by an evaluation unit of the measurement system.

Thus, a measurement method according to the invention has the same advantages as have already been described in detail with reference to a measurement device according to the invention and/or a measurement system according to the invention. Based on the light parameters, for example, a stretch measurement can be performed, preferably in a wind turbine and/or in a vehicle, in particular if the light source comprises a Fiber Bragg grating. However, it is equally conceivable that the light source itself is characterized on the basis of the light parameters.

Figure 4:
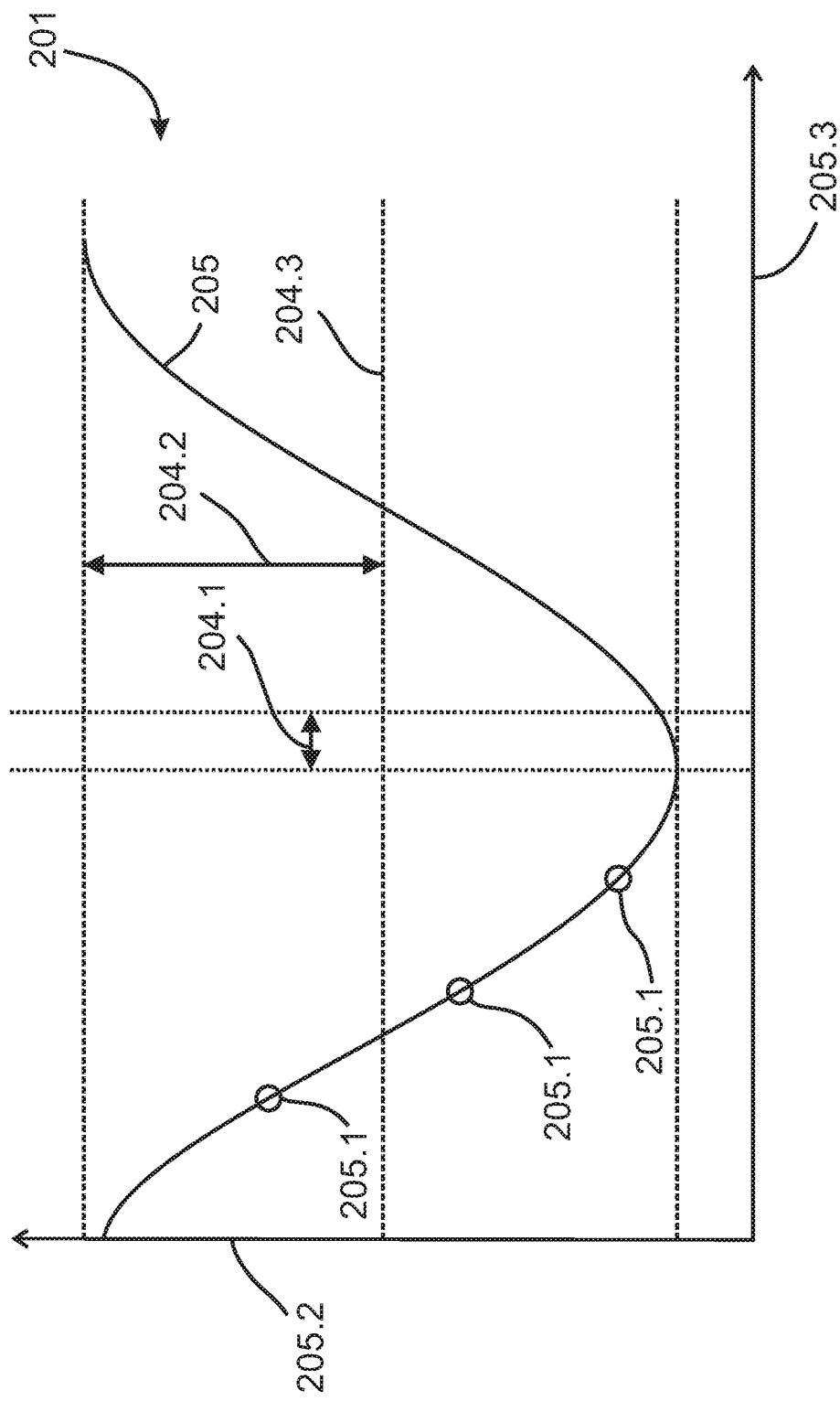
Figure 5:
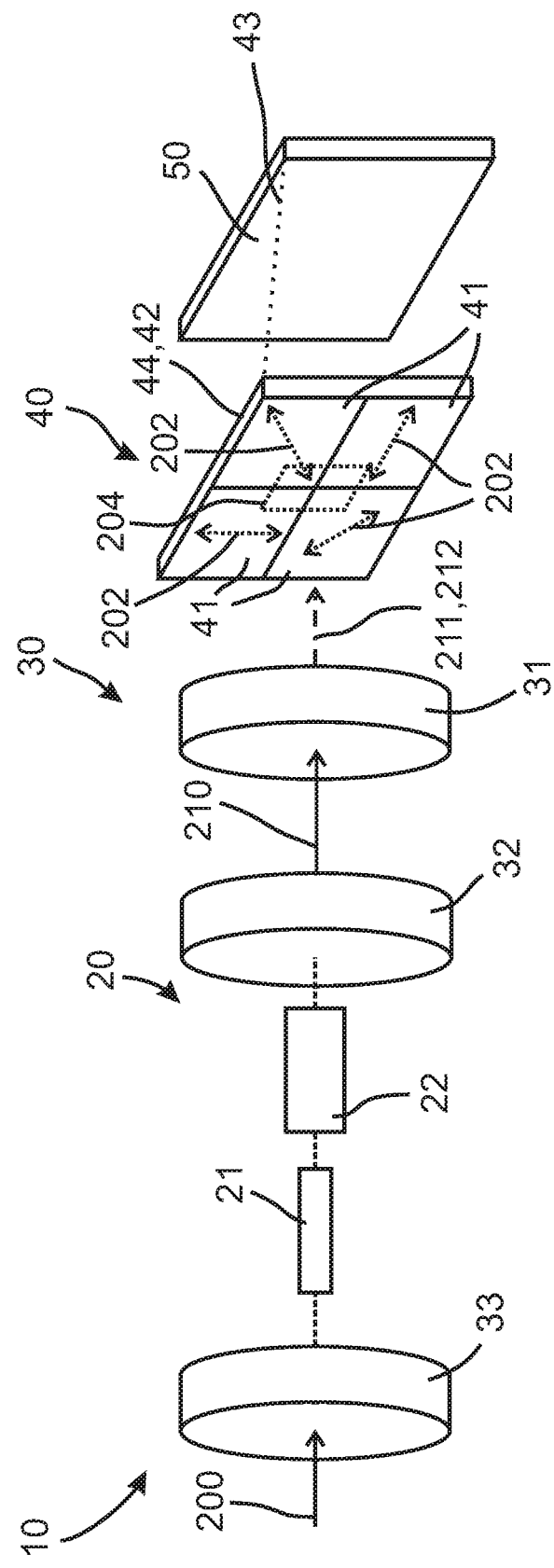

Further advantages, features and details of the invention will be apparent from the following description, in which embodiments of the invention are described in detail with reference to the drawings. In this connection, the features mentioned in the claims and in the description may each be essential to the invention individually or in any combination. It schematically shows:

FIG. 1 a measurement system according to the invention with a measurement device according to the invention in a first embodiment, FIG. 2 an exploded view of the measurement system with the measurement device, FIG. 3 a measurement method for detecting light parameters of light from a light source of the measurement system, FIG. 4 an electrical signal from a sensor unit of the measurement device, and FIGS. 5+6 further configuration options of the measurement device.

In the following description of some embodiments of the invention, the identical reference signs are used for the same technical features even in different embodiments.

FIG. 1 shows a measurement system 1 according to the invention for detecting 104 light parameters 201 of light 200 from a light source 2. The light source 2 can be, for example, a laser or a Fiber Bragg grating. In this case, the light source 2 can be characterized by the measurement system 1 on the basis of the light parameters 201 itself. However, especially if the light source 2 is a Fiber Bragg grating, the light parameters 201 may also be able to detect an external effect, such as a stretch or a change in stretch of a component. The light source 2 may be integrated into the measurement system 1, or may be provided externally to the measurement system 1 and emit only the light 200 in the direction of the measurement system 1. A measurement method 100 according to the invention for detecting the light parameters 201 of the light 200 of the light source 2 by the measurement system 1 is shown in FIG. 3 in a schematic representation of method steps/stages. The measurement method 100 is explained below in connection with the measurement system 1.

For measuring the light 200 of the light source 2, the measurement system 1 comprises a measurement device 10 according to the invention. The measurement device 10 comprises an optical unit 30 for splitting 102 a polarized light beam 210 of the light 200 into a first partial beam 211 and a second partial beam 212. It is conceivable that the light source 2 itself already emits polarized light 200, in particular linearly polarized light, so that the light beam 210 is already polarized when it enters the optical unit 30. The splitting 102 of the light beam 210 by the optical unit 30 takes place in such a way that the first and second partial beams 201, 202 have a defined phase shift relative to one another.

For detecting an interference 204 of the first and second partial beams 211, 212, the measurement device 10 comprises a sensor unit 40. The first and second partial beams 211, 212 are shown separately in FIG. 1 for improved representation, but may leave the optical unit 30 directionally, parallel and/or concentrically, whereby the first and second partial beams 211, 212 interfere in the area of the sensor unit 40, i.e., in particular, the generation 103 of the interference 204 occurs. The resulting interference 204 of the first and second partial beams 211, 212 can be detected by the sensor unit 40. Preferably, the measurement device 10 comprises a housing 11 in which the optical unit 30 and the sensor unit 40 are arranged.

For evaluating the interference 204 to detect 104 the light parameters 201 of the light 200, the measurement system 1 has an evaluation unit 50 that is connected to the sensor unit 40. The evaluation unit 50 may comprise, for example, a processor and/or a microprocessor.

FIG. 2 shows a more detailed embodiment of the measurement device 10, wherein the measurement device 10 comprises a lens 33 for receiving 101 the light 200 from the light source 2. This may generate the light beam 210, which may be initially non-linearly polarized or non-polarized (shown here as dashed) depending on the light source 2. The lens 33 may form an input to the housing 11 of the measurement device 10.

Furthermore, the measurement device 10 comprises a channeling unit 20 for channeling and/or discretizing the light 200 depending on the received light 200. The channeling unit 20 may be optically connected upstream of the optical unit 30. In particular, the channeling unit 20 is configured to convert the received light 200 into a single-channel light 200. For this purpose, the channeling unit 20 has, for example, a channeling element 21 in the form of an optical fiber, in particular in the form of a single mode fiber, for channeling the light 200. Light information of the light 200 can thus be reduced by the channeling element 21. For example, a plurality of present light parameters 201 of the light 200 can be reduced.

In particular, when the light 200 from the light source 2 is initially unpolarized, the measurement device 10, in particular the optical unit 30, further comprises a polarization element 32 for influencing a polarization of the light 200 for the polarized light beam 210. The polarization element 32 may be configured, for example, for generating a linear and/or random polarization of the light beam 210. This may create a prerequisite for splitting the polarized light beam 210 into the first and second partial beams 211, 212 with subsequent interference 204.

For splitting 102 the polarized light beam 210 into the first and second partial beams 211, 212 with the defined phase shift, the optical unit 30 has at least one delay element 31, in particular in the form of a birefringent medium, such as a crystal. In particular, the first partial beam 211 may also be referred to as an ordinary beam and the second partial beam 212 as an extraordinary beam and/or the first partial beam 211 as a slow beam and the second partial beam 212 as a fast beam or vice versa. It may be provided that the optical unit 30 comprises a plurality of delay elements 31 optically connected in series to generate the first and second partial beams 211, 212.

As shown in FIG. 2, the sensor unit 40 has two or more, in this case four, detector elements 41. Detector elements 41 are arranged in a pattern. The pattern can be configured as a regular pattern. In this case, the first and second partial beams 211, 212 can be aligned to one another with the detector elements 41 by the optical unit 30. An optical axis 203, in particular of the light beam 210 and/or of the optical unit 30, is preferably aligned with the pattern in such a way that an intensity of the first and second partial beams 211, 212 can be distributed uniformly to the detector elements 41. For example, the optical axis 203 may be alignable or aligned centered with respect to the pattern. In the present embodiment of FIG. 2, the detector elements 41 are arranged in a matrix-like pattern, in particular in a 2×2 pattern.

As shown in FIG. 5, the channeling unit 20 may further include a collimator 22 for shaping and/or parallelizing a beam path of the light 200. The collimator 22 may generate a parallel or nearly parallel beam path of the light 200, and thus preferably a linear or nearly linear guidance of the light 200, to improve the alignment of the light beam 210. In addition or alternatively to the collimator 22, the channeling unit 20 may comprise a pinhole.

Figure 6:
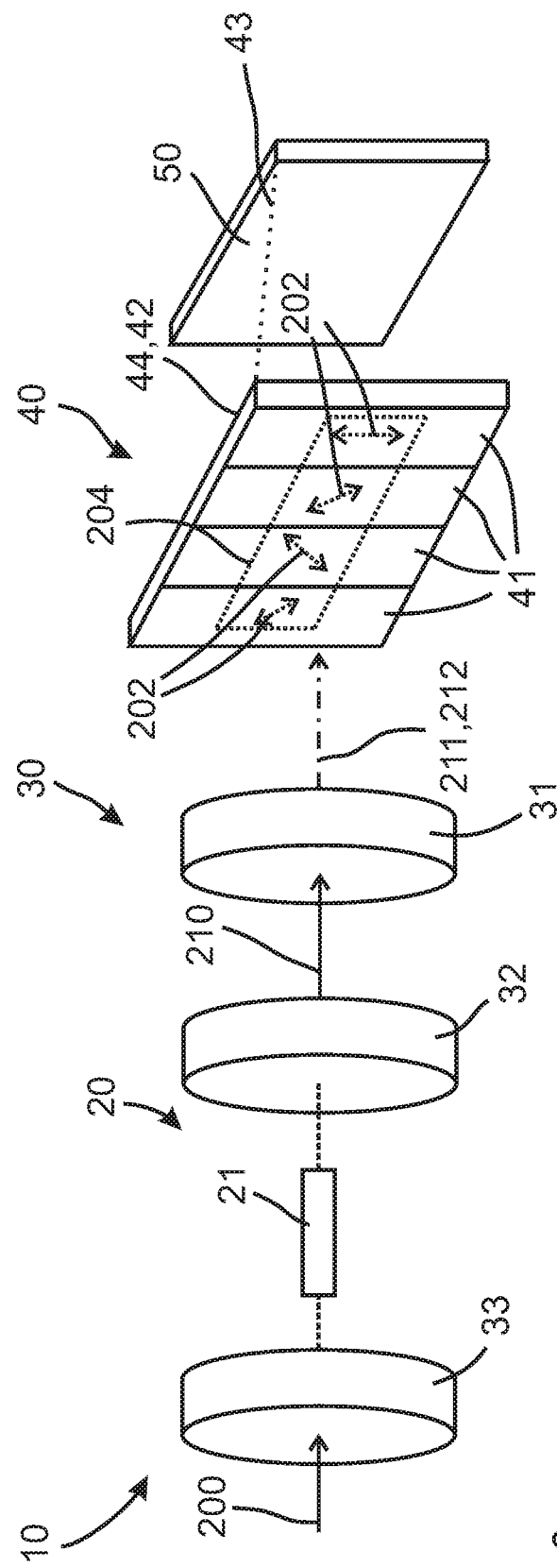

Additionally or alternatively, it can be provided that the detector elements 41 are arranged next to one another in rows, as shown in FIG. 6. In this case, an unequal distribution of the first and second partial beams 211, 212 and/or of the intensity of the first and second partial beams 211, 212 can be determined and/or calculated out by an adjustment process, e.g. by the evaluation unit 50.

The detector elements 41 further each have a polarization 202 with a respective different orientation about the optical axis 203. Thus, the sensor unit 40 with the four detector elements 41 also comprises four different polarizations 202. For this purpose, for example, one polarizer can be integrated in each of the detector elements 41. It may be provided that the sensor unit 40 and/or the detector elements 41 are configured to be rotatable relative to the optical unit 30 for adjusting the measurement device 10. Additionally or alternatively, the detector elements 41 may be attached in a layer-like manner to a printed circuit board 44 of the sensor unit 40, in particular printed thereon.

Furthermore, the sensor unit 40 comprises an evaluation circuit 42 through which the detector elements 41 are connected for detecting the interference 204. For outputting a signal 205, the sensor unit 40 further comprises an electrical measurement output 43 for outputting a modulation of the signal 205 and/or of data points 205.1 for modulating the signal 205 depending on the interference 204. For this purpose, the evaluation circuit 42 is configured to provide the signal 205 and/or the data points 205.1 in a multiplexing method, in particular in the form of a space multiplexing method. The evaluation circuit 42 may in particular be arranged on the printed circuit board 44, for example on a rear side of the printed circuit board 44.

The signal 205 is shown in FIG. 4. A signal intensity 205.2 is plotted against a signal phase 205.3. The signal intensity 205.2 and the signal phase 205.3 may be represented in the signal in terms of electrical current parameters and/or time. For example, the signal intensity 205.2 may be represented by a current and/or a voltage at the measurement output 43 and/or may be proportional to an intensity of the light 200. The signal phase 205.3 may be expressed by the readout of one of the detector elements 41 and/or a time in the multiplexing method. The evaluation unit 50 is thereby configured to determine the light parameters 201 in the form of a wavelength of the light 200 depending on a phase 204.1 of the interference 204, in the form of a bandwidth of the light 200 depending on an amplitude 204.2 of the interference 204, and/or in the form of a power of the light 200 depending on a mean value 204.3 of the interference 204. For this purpose, the signal 205 can be evaluated by the evaluation unit 50.

By aligning the first and second light beams 210 to one another, the complexity of the measurement device 10 can be reduced by performing the measurement of the light 200 based on the light beam 210, in particular a single light beam 210. It has thus been recognized in the context of the invention that an evaluation of reduced light information is sufficient for many applications. As a result, the complexity of the measurement system 1 with the measurement device 10 can be reduced and the robustness of the measurement method 100 with respect to environmental influences can be increased.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS

1 Measurement system
2 Light source
10 Measurement device
11 Housing
20 Channeling unit
21 Channeling element
22 Collimator
30 Optical unit
31 Delay element
32 Polarization element
33 Lens
40 Sensor unit
41 Detector elements
42 Evaluation circuit
43 Measurement output
44 Circuit board
50 Evaluation unit
100 Measurement method
200 Light
201 Light parameters
202 Polarization
203 Axis
204 Interference
204.1 Phase
204.2 Amplitude
204.3 Mean value
205 Signal
205.1 Data point
205.2 Signal intensity
205.3 Signal phase
210 Light beam
211 First partial beam
212 Second partial beam

The invention claimed is:

1. A measurement device for measuring light of a light source comprising
an optical device configured to split a polarized light beam of the light into a first partial beam and a second partial beam, which have a defined phase shift relative to one another,
a sensor device having at least two detector elements, each having a polarization with a different orientation about an optical axis, and
a channeling device configured to at least channel or discretize the light depending on a received light from the light source, the channeling device being optically connected upstream of the optical device,
wherein the first and second partial beams are alignable to one another on the detector elements by the optical device in order to detect interference of the first and second partial beams by the detector elements,
wherein the channeling device is configured to convert the received light into a single-channel light,
wherein the channeling device has a channeling element in the form of exactly one optical fiber for channeling the light.

2. The measurement device according to claim 1, wherein
the optical device comprises at least one delay element.

3. The measurement device according to claim 1, wherein
the measurement device has a polarization element configured to influence a polarization of the light for the polarized light beam.

4. The measurement device according to claim 3, wherein
the polarization element is configured to generate at least a linear or random polarization of the light beam.

5. The measurement device according to claim 1, wherein
the channeling device comprises at least a collimator or a pinhole configured to form a beam path of the light.

6. The measurement device according to claim 1, wherein
the sensor device has three or more detector elements.

7. The measurement device according to claim 1, wherein
the sensor device has an electrical measurement output configured to at least output a modulation of a signal or output data points for modulating a signal depending on the interference.

8. The measurement device according to claim 1, wherein
the sensor device has an evaluation circuit in which the detector elements for detecting the interference are connected, the evaluation circuit being configured to provide at least the signal or the data points by means of a multiplexing method.

9. The measurement device according to claim 1, wherein the detector elements are attached in a layer-like manner on a printed circuit board of the sensor device.

10. The measurement device according to claim 1, wherein
at least the sensor device or the detector elements are configured to be rotatable relative to the optical device for adjusting the measurement device.

11. A measurement system for detecting light parameters of light from a light source comprising
a measurement device, which comprises an optical device configured to split a polarized light beam of the light into a first partial beam and a second partial beam, which have a defined phase shift relative to one another, a sensor device having at least two detector elements, which each have a polarization with a different orientation about an optical axis, and a channeling device configured to at least channel or discretize the light depending on a received light from the light source, the channeling device being optically connected upstream of the optical device, wherein the first and second partial beams are alignable to one another by the optical device to the detector elements to detect interference of the first and second partial beams by the detector elements,
wherein the channeling device is configured to convert the received light into a single-channel light,
wherein an evaluation device of the measurement system is configured to evaluate the interference to detect light parameters of the light,
wherein the channeling device has a channeling element in the form of exactly one optical fiber for channeling the light.

12. The measurement system according to claim 11, wherein
the evaluation device is configured for determining the light parameters in the form of a wavelength of the light depending on a phase of the interference, a bandwidth of the light depending on of at least an amplitude of the interference or a power of the light depending on a mean value of the interference.

13. A measurement method for detecting light parameters of light from a light source by a measurement system for detecting light parameters of light from a light source, the measurement system comprising
a measurement device, which comprises an optical device configured to split a polarized light beam of the light into a first partial beam and a second partial beam, which have a defined phase shift relative to one another, a sensor device having at least two detector elements, which each have a polarization with a different orientation about an optical axis, and a channeling device configured to at least channel or discretize the light depending on a received light from the light source, the channeling device being optically connected upstream of the optical device, wherein the first and second partial beams are alignable to one another by the optical device to the detector elements to detect interference of the first and second partial beams by the detector elements,
wherein the channeling device is configured to convert the received light into a single-channel light,
wherein the channeling device has a channeling element in the form of exactly one optical fiber for channeling the light,
wherein the measurement system comprises an evaluation device configured to evaluate the interference to detect light parameters of the light, the measurement method comprising:
Receiving light from the light source,
At least channeling or discretizing the light depending on the received light,
Splitting the polarized light beam of the light into the first partial beam and the second partial beam,
Generating the interference depending on the first and second partial beams,
Detecting the light parameters of the light depending on the interference.

* * * * *